US012722734B2

(12) United States Patent
Chang et al.

(10) Patent No.: US 12,722,734 B2
(45) Date of Patent: Sep. 1, 2026

(54) SYSTEM, METHOD, AND NON-VOLATILE COMPUTER-READABLE STORAGE MEDIUM APPLIED FOR BIKE FITTING

(71) Applicant: Giant Manufacturing Co., Ltd., Taichung City (TW)

(72) Inventors: Ya-Han Chang, Taichung City (TW); Chin-Lai Huang, Taichung City (TW); Chih-Kai Chang, Taichung City (TW)

(73) Assignee: Giant Manufacturing Co., Ltd., Taichung City (TW)

( * ) Notice: Subject to any disclaimer, the term of this patent is extended or adjusted under 35 U.S.C. 154(b) by 31 days.

(21) Appl. No.: 18/931,065

(22) Filed: Oct. 30, 2024

(65) Prior Publication Data

US 2025/0136228 A1 May 1, 2025

Related U.S. Application Data

(60) Provisional application No. 63/595,327, filed on Nov. 1, 2023.

(51) Int. Cl.
*B62J 50/22* (2020.01)
*B62J 45/41* (2020.01)
*G06T 7/70* (2017.01)

(52) U.S. Cl.
CPC ............... *B62J 50/22* (2020.02); *B62J 45/41* (2020.02); *G06T 7/70* (2017.01); *G06T 2207/30196* (2013.01)

(58) Field of Classification Search
None
See application file for complete search history.

(56) References Cited

U.S. PATENT DOCUMENTS 10,722,166 B2 7/2020 Bigolin et al.
10,870,038 B2 12/2020 Nagasaka et al.
2007/0142177 A1 6/2007 Simms et al.
2010/0306160 A1 12/2010 Simms
(Continued)

FOREIGN PATENT DOCUMENTS

CN 104368972 2/2015
CN 107054525 8/2017
(Continued)

OTHER PUBLICATIONS

"Office Action of Taiwan Counterpart Application", issued on May 12, 2025, p. 1-p. 11.

(Continued)

*Primary Examiner* — Thomas S Mccormack
(74) *Attorney, Agent, or Firm* — JCIPRNET

(57) ABSTRACT

A system, a method, and a non-volatile computer-readable storage medium for bike fitting are provided. The system includes an image capture device, a first force sensor, and a processor. The image capture device captures an image of a user riding a first bicycle. The first force sensor is disposed on the first bicycle to detect a first force. The processor is communicatively connected to the image capture device and the first force sensor, in which the processor is configured to execute: determining a first riding position of the user according to the image; generating a first bicycle specification according to the first riding position and the first force; and outputting the first bicycle specification.

19 Claims, 5 Drawing Sheets

(56) References Cited

U.S. PATENT DOCUMENTS

| | | | | |
|---|---|---|---|---|
| 2014/0379135 | A1* | 12/2014 | Kristiansen | G05B 13/02 700/275 |
| 2019/0383627 | A1* | 12/2019 | Nangeroni | B60W 50/0098 |

FOREIGN PATENT DOCUMENTS

| | | |
|---|---|---|
| EP | 2837329 | 2/2015 |
| EP | 3240480 | 10/2018 |
| JP | 2016158780 | 9/2016 |
| JP | 2022546115 | 11/2022 |
| KR | 20070038633 | 4/2007 |
| WO | 2019223895 | 11/2019 |
| WO | 2021041967 | 3/2021 |

OTHER PUBLICATIONS

"Search Report of Europe Counterpart Application", issued on Feb. 25, 2025, p. 1-p. 8.

"Office Action of Japan Counterpart Application", issued on Mar. 18, 2026, p. 1-p. 4.

* cited by examiner

SYSTEM, METHOD, AND NON-VOLATILE COMPUTER-READABLE STORAGE MEDIUM APPLIED FOR BIKE FITTING

CROSS-REFERENCE TO RELATED APPLICATION

This application claims the priority benefit of U.S. provisional application Ser. No. 63/595,327, filed on Nov. 1, 2023. The entirety of the above-mentioned patent application is hereby incorporated by reference herein and made a part of this specification.

BACKGROUND

Technical Field

The disclosure relates to sports equipment, and particularly relates to a system, a method, and a non-volatile computer-readable storage medium for fitting a bicycle.

Description of Related Art

In order to improve the user's comfort or efficiency when riding a bicycle, bike fitting may be performed. Bike fitting configures the user's exclusive bicycle specification. The assembled bicycle based on the bicycle specification could further adjust and optimize the user's riding position. Traditional bike fitting systems perform image recognition on the bicycle user to obtain the user's riding position. Since the camera may usually only be configured in a fixed location, the user needs to ride the bicycle in the indoor environment. However, riding the bicycle indoors and riding the bicycle outdoors are two completely different situations. For example, the indoor riding environment may not simulate as rich terrain changes as the outdoor environment, and the user does not need to worry about the dynamic balance of the bicycle adapting to changes in the outdoor environment when riding the bicycle indoors. Therefore, bike fitting based on the indoor riding environment often may not perfectly adapt to the outdoor riding environment.

SUMMARY

The disclosure provides a system, a method, and a non-volatile computer-readable storage medium for bike fitting, which may configure exclusive bicycle specifications for bicycle users.

A system for fitting a bicycle according to the disclosure includes an image capture device, a first force sensor, and a processor. The image capture device captures an image of a user riding a first bicycle. The first force sensor is disposed on the first bicycle to detect a first force. The processor is communicatively connected to the image capture device and the first force sensor, in which the processor is configured to execute: determining a first riding position of the user according to the image; generating a first bicycle specification according to the first riding position and the first force; and outputting the first bicycle specification.

In an embodiment of the disclosure, the system further includes a second force sensor. The second force sensor is communicatively connected to the processor and disposed on a second bicycle corresponding to the first bicycle specification to detect a second force. The processor updates the first bicycle specification according to the first riding position, the first force, and the second force.

In an embodiment of the disclosure, the system further includes a second force sensor. The second force sensor is communicatively connected to the processor and disposed on a second bicycle corresponding to the first bicycle specification to detect a second force. The processor generates a plurality of bicycle specifications according to the image and the first force. The plurality of bicycle specifications include the first bicycle specification. The processor selects the first bicycle specification from the plurality of bicycle specifications according to the second force, and outputs the selected first bicycle specification.

In an embodiment of the disclosure, the system further includes a third force sensor. The third force sensor is communicatively connected to the processor and disposed on the second bicycle to detect a third force. The processor selects the first bicycle specification from the plurality of bicycle specifications according to the second force and the third force.

In an embodiment of the disclosure, the processor is configured to further execute: calculating a first difference between the second force and the third force; and selecting the first bicycle specification from the plurality of bicycle specifications according to the first difference.

In an embodiment of the disclosure, the system further includes a fourth force sensor and a fifth force sensor. The fourth force sensor is communicatively connected to the processor and disposed on a third bicycle corresponding to a second bicycle specification to detect a fourth force. The fifth force sensor is communicatively connected to the processor and disposed on the third bicycle to detect a fifth force. The processor calculates a second difference between the fourth force and the fifth force. In response to the first difference being less than the second difference, the processor selects the first bicycle specification from the first bicycle specification and the second bicycle specification.

In an embodiment of the disclosure, the second force includes a first pressure distribution, and the system further includes a third force sensor. The third force sensor is communicatively connected to the processor and disposed on a third bicycle corresponding to a second bicycle specification to detect a second pressure distribution. The processor calculates a first pressure difference according to the first pressure distribution, and calculates a second pressure difference according to the second pressure distribution. In response to the first pressure difference being less than the second pressure difference, the processor selects the first bicycle specification from the first bicycle specification and the second bicycle specification.

In an embodiment of the disclosure, the system further includes a second force sensor, a third force sensor, and a fourth force sensor. The second force sensor is communicatively connected to the processor and disposed on the first bicycle to detect a second force. The third force sensor is communicatively connected to the processor and disposed on a second bicycle corresponding to a second bicycle specification to detect a third force. The fourth force sensor is communicatively connected to the processor and disposed on the second bicycle to detect a fourth force. The processor calculates a first difference between the first force and the second force, and calculates a second difference between the third force and the fourth force. The processor updates the first bicycle specification according to the first difference and the second difference.

In an embodiment of the disclosure, the processor selects the second bicycle specification from a plurality of bicycle specifications to update the first bicycle specification according to the second difference.

In an embodiment of the disclosure, the first force sensor includes a strain gauge disposed on at least one of a saddle, a handlebar, a pedal, and a crankset of the first bicycle.

In an embodiment of the disclosure, the first force sensor includes an inertial measurement unit disposed on a crankset or a pedal of the first bicycle.

In an embodiment of the disclosure, the first force sensor includes a piezoelectric film, a resistive sensor, or a capacitive sensor disposed on at least one of a handlebar and a saddle of the first bicycle.

A method for fitting a bicycle according to the disclosure includes: capturing an image of a user riding a first bicycle; disposing a first force sensor on the first bicycle to detect a first force; determining a first riding position of the user according to the image; generating a first bicycle specification according to the first riding position and the first force; and outputting the first bicycle specification.

A non-volatile computer-readable storage medium applied for bike fitting of the disclosure, wherein the non-volatile computer-readable storage medium may read instructions via a processor to perform the following steps: capturing an image of a user riding a first bicycle; detecting a first force through a first force sensor disposed on the first bicycle; determining a first riding position of the user according to the image; generating a first bicycle specification according to the first riding position and the first force; and outputting the first bicycle specification.

Based on the above, the system of the disclosure may first generate the preliminary bicycle specification for the user who rides the bicycle in the indoor environment. Then, after the system collects the sensing data of the user when riding the bicycle in the outdoor environment, the system may generate the optimal bicycle specification for the user according to the collected sensing data. The bicycle fit to the optimal bicycle specification may improve the user's riding position or increase the user's efficiency in riding the bicycle.

DESCRIPTION OF THE EMBODIMENTS

Figure 1:
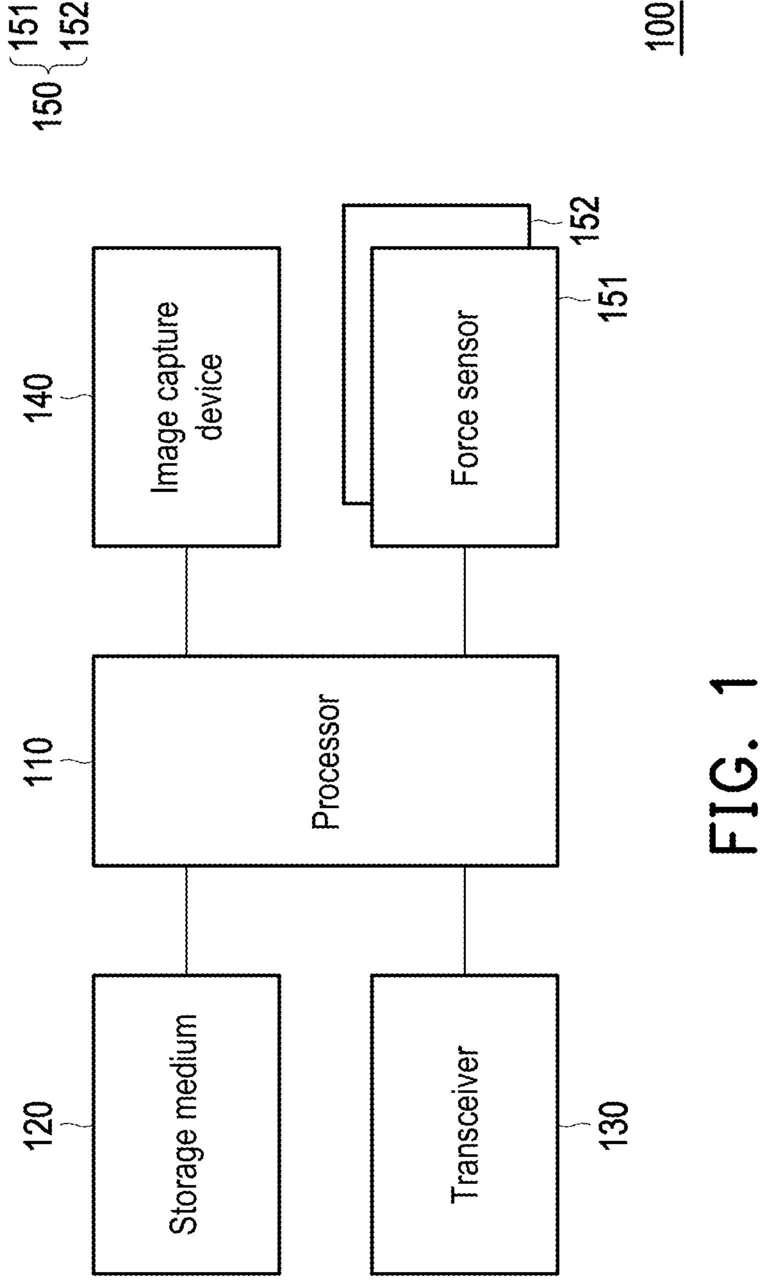
FIG. 1 is a schematic diagram of a system for bike fitting according to an embodiment of the disclosure.

FIG. 1 is a schematic diagram of a system 100 for bike fitting according to an embodiment of the disclosure. The system 100 may include a processor 110, a storage medium 120, a transceiver 130, an image capture device 140, and one or more force sensors 150. The force sensor 150 includes, for example, a force sensor 151 and a force sensor 152.

The processor 110 is, for example, a central processing unit (CPU) or other programmable general-purpose or special-purpose micro control units (MCUs), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar elements, or a combination thereof. The processor 110 may be communicatively connected to the storage medium 120, the transceiver 130, the image capture device 140, and the force sensor 150, and access and execute an instruction (set), a plurality of modules, and various application programs stored in the storage medium 120.

The storage medium 120 is, for example, any form of fixed or movable random access memory (RAM), a read-only memory (ROM), a flash memory, a hard disk drive (HDD), a solid state drive (SSD), or a similar element, or a combination thereof, used to store an instruction (set), a plurality of modules, or various application programs that may be executed by the processor 110.

The transceiver 130 transmits or receives signals in a wireless or wired manner. The transceiver 130 may also perform, for example, noise suppression, impedance matching, mixing, up or down frequency conversion, filtering, amplification, and similar operations. The system 100 may receive signals from external electronic devices or transmit signals to external electronic devices through the transceiver 130.

The image capture device 140 may include a photosensitive element such as a complementary metal oxide semiconductor (CMOS) or a charge coupled device (CCD).

The force sensor 150 may be disposed at a specific position on the bicycle to detect the force exerted by the user on the specific position when riding the bicycle. For example, the force sensor 150 may sense information such as the magnitude of the force, the direction of the force, the angle of the force, angular velocity, angular acceleration, or pressure distribution.

Figure 2:
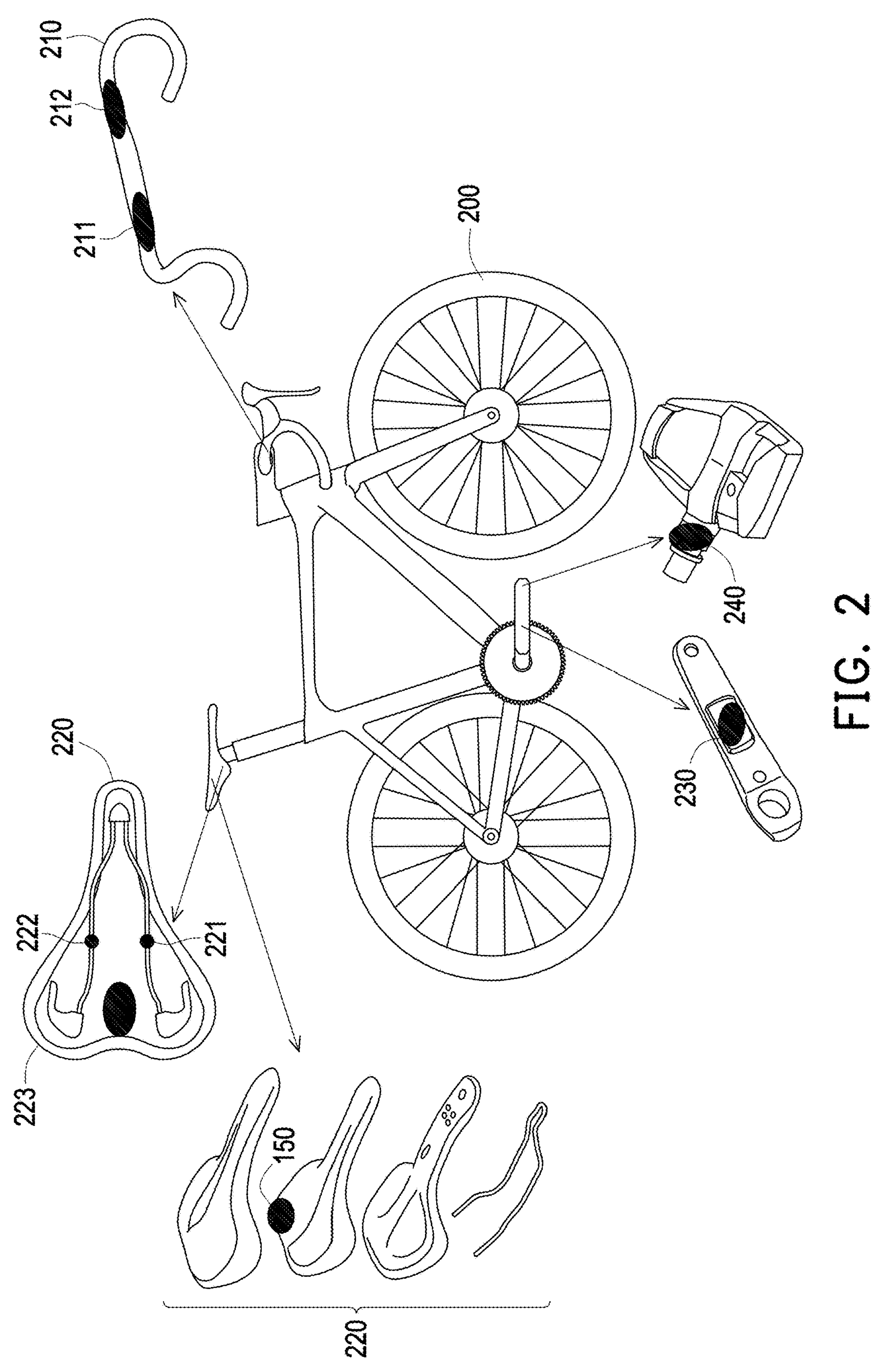
FIG. 2 is a schematic diagram of a bicycle according to an embodiment of the disclosure.

FIG. 2 is a schematic diagram of a bicycle 200 according to an embodiment of the disclosure. In an embodiment, the force sensor 150 may include a strain gauge. The strain gauge may be disposed on a handlebar 210, a saddle 220, a crankset 230, or a pedal 240 of the bicycle 200 to measure the force exerted on the bicycle 200 by parts of the user such as feet, hands, or pelvis. The raw data detected by the strain gauge may include changes in physical quantity data such as voltage. For example, the force sensors 151 and 152 may be disposed on a right half 211 and a left half 212 of the handlebar 210, respectively. The force sensor 151 is used to detect the force exerted by the user's right hand on the handlebar 210, and the force sensor 152 is used to detect the force exerted by the user's left hand on the handlebar 210. The detection result of the strain gauge may be used to calculate the center of gravity trajectory, sensing points force distribution ratio, force direction, or stability.

In an embodiment, the force sensor 150 may include any one of a piezoelectric film, a resistive sensor, or a capacitive sensor. The force sensor 150 may be disposed on the handlebar 210 or the saddle 220 of the bicycle 200 to measure the force or pressure distribution exerted by the user's pelvis or hands on the bicycle 200. For example, the force sensor 150 may be disposed at a position 223 of the saddle (e.g., between the leather and foam of the saddle 220). As another example, the force sensors 151 and 152 may be respectively disposed on a right half 221 and a left half 222 of the saddle 220 to detect the user's pressure distribution on the saddle 220. The detection result of the piezoelectric film, the resistive sensor, or the capacitive sensor may be used to calculate the center of gravity trajectory, sensing points force distribution ratio, force direction, or stability. The resistive sensor may be in the form of a resistive film, and the capacitive sensor may be in the form of a capacitive film, or other similar flexible bendable sensor.

In an embodiment, the force sensor 150 may include an inertial measurement unit. The inertial measurement unit may be disposed on the crankset 230 or the pedal 240 of the bicycle 200 to measure information such as angle, angular velocity, or angular acceleration. The detection result of the inertial measurement unit may be used to calculate stability.

Figure 3:
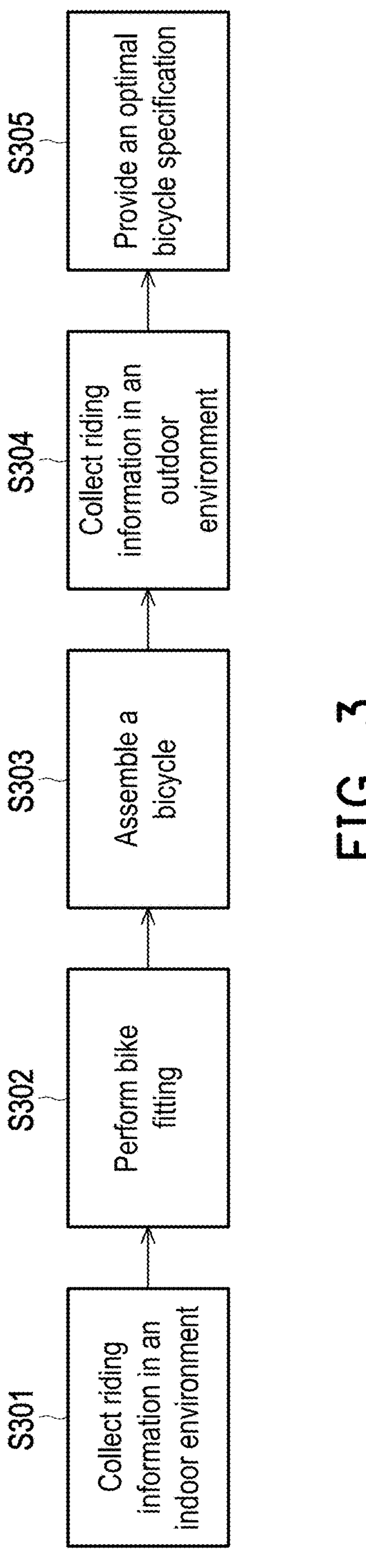
FIG. 3 is a flowchart for bike fitting according to an embodiment of the disclosure.

FIG. 3 is a flowchart for bike fitting according to an embodiment of the disclosure, in which the steps in the flowchart may be implemented by the system 100 shown in FIG. 1.

In step S301, the processor 110 may collect riding information generated when the user rides the bicycle in an indoor environment. Specifically, the processor 110 may capture an image of the overall changes of the user's trunk and limbs when riding the bicycle through the image capture device 140. The processor 110 may perform image recognition on the image to determine the user's riding position. On the other hand, the processor 110 may detect the force (also referred to as "the first force") exerted by the user on the bicycle through the force sensor 150.

The processor 110 may use a weight to correct the detection result of the force sensor 150. For example, the processor 110 may multiply the force detected by the force sensor 150 with a weight to generate a corrected force. In an embodiment, the processor 110 may consider selecting corresponding weights based on factors such as riding scenario, road condition, riding preference, rider gender, or cyclist body physiological value. Table 1 is an example of the weights of the force sensor 150.

TABLE 1

| Riding scenario | Handlebar force | Saddle force | Pedal and/or crankset force |
|---|---|---|---|
| Off-road scenario | 60% | 0% | 40% |
| Asphalt road scenario | 20% | 50% | 30% |

In an embodiment, one or more force sensors 150 may be disposed at different positions on the bicycle. Depending on the sensor setting manner, force detection may include bilateral sensing or unilateral sensing. Tables 2 and 3 are examples of the number and position of the force sensors 150 corresponding to various bicycle specifications.

TABLE 2

| Double pedal (bilateral sensing) | Hand (number of sensors) | Foot (number of sensors) | Pelvis (number of sensors) |
|---|---|---|---|
| Specification A | 2 | 2 | 1 |
| Specification B | 0 | 2 | 1 |
| Specification C | 2 | 0 | 1 |
| Specification D | 2 | 2 | 0 |
| Specification E | 2 | 0 | 0 |
| Specification F | 0 | 2 | 0 |
| Specification G | 0 | 0 | 1 |
| Position | The handlebar may include: a flat bar, a drop bar, a grip, and a stem | The pedal and/or the crankset may include: a crank arm, a spider, a chainring, and a BB axle. | The saddle may include: a pad, a rail, a bottom shell, a clamp, and a seatpost |

TABLE 3

| Single pedal (unilateral sensing) | Hand (number of sensors) | Foot (number of sensors) | Pelvis (number of sensors) |
|---|---|---|---|
| Specification H | 2 | 1 | 1 |
| Specification I | 0 | 1 | 1 |
| Specification J | 2 | 0 | 1 |
| Specification K | 2 | 1 | 0 |
| Specification L | 2 | 0 | 0 |
| Specification M | 0 | 1 | 0 |
| Specification N | 0 | 0 | 1 |
| Position | The handlebar may include: a stem | The crankset may include: a spider, a BB axle, and a chainring. | The saddle may include: a pad, a rail, a bottom shell, a clamp, and a seatpost |

In step S302, the processor 110 may perform bike fitting according to the user's riding position and applying force to generate one or more bicycle specifications. The bicycle specifications may include parameters such as bike geometry, frame size, tire size, handlebar size, handlebar position, stem length, crank length, Q-factor, saddle accessories, saddle position, pedal to saddle distance, seat tube length, seat tube angle, top tube length, head tube length, head tube angle, fork rake, fork trail, wheelbase, chain stay length, bottom bracket drop (or BB drop), stack, reach or inseam, and the disclosure is not limited thereto.

In an embodiment, the storage medium 120 may pre-store a lookup table, in which the lookup table may include mapping relationships between riding positions, applying force, and bicycle specification parameters. After obtaining the user's riding position and applying force, the processor 110 may query the lookup table according to the riding position and applying force to determine the bicycle specifications.

In step S303, the processor 110 may output the bicycle specifications through the transceiver 130. In an embodiment, the processor 110 may output one or more bicycle specifications through an output device such as a display. Bike fitting for a user may be performed based on the output information from the processor 110 and the corresponding assembly of one or more bicycles according to the bicycle specifications may be performed. In an embodiment, processor 110 may further transmit one or more bicycle specifications to production equipment such as a robotic arm. After completing the fitting process, the production equipment may assemble one or more bicycles corresponding to the bicycle specifications according to one or more bicycle specifications.

In step S304, the processor 110 may collect riding information generated when the user rides the bicycle in an outdoor environment. Specifically, one or more force sensors 150 may be disposed on the bicycle. When the user rides the bicycle, the processor 110 may detect the force exerted by the user on the bicycle through the force sensor 150 and record the detection result. The force sensor 150 used in step S304 and the force sensor 150 used in step S301 may be the same or different.

In step S305, the processor 110 may generate or update the bicycle specifications according to the information obtained in step S304, thereby providing the user with the optimal bicycle specification. The processor 110 may output the optimal bicycle specification through the transceiver 130 for user to perform fitting or the bicycle may be assembled by the production equipment according to the fitting result.

In one instance, based on analysis and comparison of the image obtained in step 301 and the detected force (that is, the user's force when riding the bicycle in the indoor environment) and the detected force in step S304 (that is, the user's force when riding the bicycle in the outdoor environment), the processor 110 may obtain the optimal bicycle specification or to select the optimal bicycle specification from a plurality of bicycle specifications.

In an embodiment, the processor 110 may determine the stability (e.g., longitudinal stability or lateral stability) of the bicycle when being ridden according to the force detected in step S304. The processor 110 may select the bicycle specification with the optimal stability from the plurality of bicycle specifications as the optimal bicycle specification. For example, the force detected by the processor 110 in step S304 may include the force (hereinafter referred to as "force A" or "second force") exerted on the right half (e.g., the right half 211 of the handlebar 210, the right half 221 of the saddle 220, or the right pedal 240) of the bicycle component (e.g., the handlebar 210, the saddle 220, or the pedal 240) and the force (hereinafter referred to as "force B" or "third force") exerted on the left half (e.g., the left half 212 of the handlebar 210, the left half 222 of the saddle 220, or the left pedal 240) of the bicycle component by the user. The processor 110 may select a bicycle specification from the plurality of bicycle specifications as the optimal bicycle specification according to the second force and the third force. Specifically, the processor 110 may calculate the difference between the force A and the force B, so as to select the optimal bicycle specification from the plurality of bicycle specifications according to the difference. The smaller the difference between the force A and the force B, the more suitable the corresponding bicycle specifications are for the user. For example, assume that the user rides two bicycles outdoors, namely the first bicycle and the second bicycle. Assuming that the difference between the force A and the force B when the user is riding the first bicycle is smaller than the difference between the force A and the force B when the user is riding the second bicycle, it means that the user stability when riding the first bicycle is better than the user stability when riding the second bicycle. Accordingly, the processor 110 may select the bicycle specification corresponding to the first bicycle from the plurality of bicycle specifications as the optimal bicycle specification.

In an embodiment, the force detected by the processor 110 in step S304 may include the user's pressure distribution on the bicycle components (e.g., saddle 220). The processor 110 may calculate a pressure difference (e.g., the difference between the pressure exerted by the user on the right half 221 and the left half 222 of the saddle 220) according to the pressure distribution. The processor 110 may select a bicycle specification from the plurality of bicycle specifications as the optimal bicycle specification according to the pressure difference. For example, assume that the user rides two bicycles outdoors, namely the first bicycle and the second bicycle. Assuming that the pressure difference caused by the user when riding the first bicycle is smaller than the pressure difference caused by the user when riding the second bicycle, it means that the user stability when riding the first bicycle is better than the user stability when riding the second bicycle. Accordingly, the processor 110 may select the bicycle specification corresponding to the first bicycle from the plurality of bicycle specifications as the optimal bicycle specification.

In an embodiment, the bicycle that the user rides outdoors may include a third bicycle in addition to the second bicycle. Similarly, the user may detect and record the fourth force and the fifth force on the third bicycle to further analyze and select the optimal bicycle specification.

Figure 4:
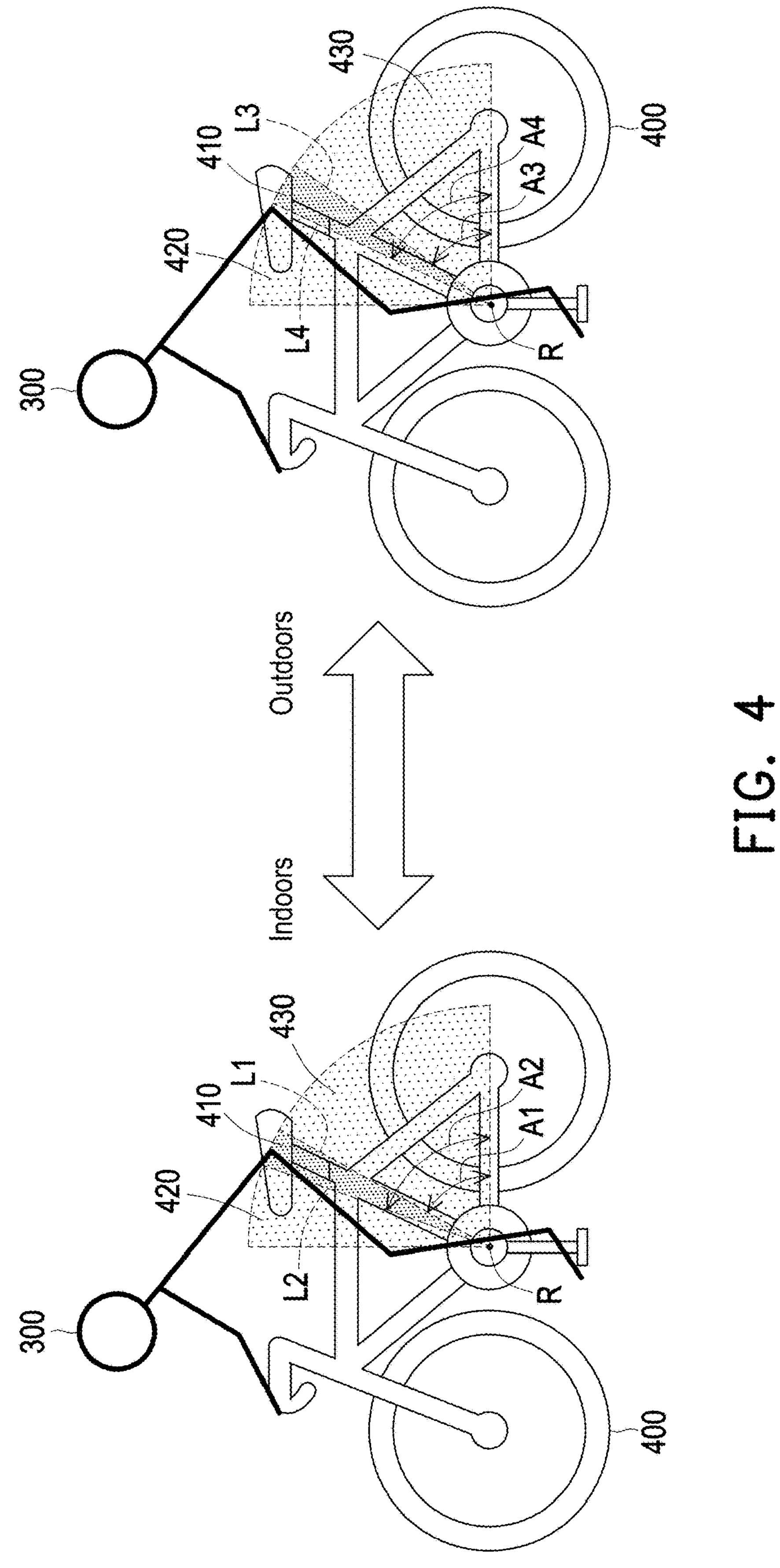
FIG. 4 is a schematic diagram of a good zone and a bad zone according to an embodiment of the disclosure.

FIG. 4 is a schematic diagram of a good zone 410 and bad zones 420 and 430 according to an embodiment of the disclosure. The good zone 410 may also be referred to as the ideal zone or the optimal zone, and the bad zone may also be referred to as the non-ideal zone or the non-optimal zone. The substantive meaning is explained below. When the contact position of a user 300 with the saddle or the sitting point is maintained in the good zone 410, the user's ankles, knees, hips, or pelvis may naturally be in a better position, indicating that the user 300 has reached a comfortable or efficient riding position. When the contact position of the user 300 with the saddle or the sitting point is not maintained in the good zone 410 but remains in the bad zone 420 or 430, the user's ankles, knees, hips, or pelvis is in a poor position, indicating that the user 300 has not reached a comfortable or efficient riding position. As can be seen from FIG. 4, the good zone 410 may change when the user 300 rides a bicycle 400 in different environments (that is, indoor environment or outdoor environment). Therefore, if bike fitting is performed solely based on information collected in the indoor environment, the bicycle specifications generated by bike fitting may not meet the riding requirements that are most suitable for the outdoor environment. In contrast, the system 100 of the disclosure considers both the information collected in the indoor environment and the information collected in the outdoor environment when performing bike fitting. Therefore, the bicycle specifications generated by the system 100 may be fit according to user requirements to adapt to the changing outdoor environment.

In an embodiment, the good zone 410 may be fan-shaped, and the center of the fan shape may be located at the center of the bottom bracket as a reference point R. When indoors, the angle between a boundary L1 of the good zone 410 and the horizontal plane is A1, and the angle between a boundary L2 and the horizontal plane is A2. When outdoors, the angle between a boundary L3 of the good zone 410 and the horizontal plane is A3, and the angle between a boundary L4 and the horizontal plane is A4. The processor 110 may update the angles A1 and A2 corresponding to the indoors to the angles A3 and A4 corresponding to the outdoors respectively according to the user's indoor riding information and the user's outdoor riding information.

The processor 110 may obtain a plurality of detection results respectively corresponding to a plurality of indoor bicycle specifications through the force sensor 150, and determine the angles A1 and A2 according to the plurality of detection results. The processor 110 may determine a bicycle specification f(A1) according to equation (1), and select the angle A1 corresponding to the bicycle specification f(A1) as the angle of the boundary L1 of the good zone 410, where i is the index of the plurality of indoor bicycle specifications ($i \leq I$, where I is the number of the plurality of indoor bicycle specifications), $F_{L,i}$ is the force exerted on the left half of the handlebar (or the left half of the saddle or the left pedal), and $F_{R,i}$ is the force exerted on the right half of the handlebar (or the right half of the saddle or the right pedal). Similarly, the processor 110 may determine a bicycle specification f(A2) according to equation (2), and select the angle A2 corresponding to the bicycle specification f(A2) as the angle of the boundary L2 of the good zone 410. To illustrate, after obtaining the plurality of detection results respectively corresponding to the plurality of indoor bicycle specifications, the processor 110 may select the bicycle specification f(A1) that is the most stable (i.e., the smallest absolute difference between the forces exerted by the user on the left half of the handlebar and the right half of the handlebar) to determine the angle A1, and may select the bicycle specification f(A2) that is the most unstable (i.e., the largest absolute difference between the forces exerted by the user on the left half of the handlebar and the right half of the handlebar) to determine the angle A2 according to the plurality of detection results.

$$f(A1) = \underset{i}{\operatorname{argmin}} |F_{L,i} - F_{R,i}| \tag{1}$$

$$f(A2) = \underset{i}{\operatorname{argmax}} |F_{L,i} - F_{R,i}| \tag{2}$$

It should be noted that the plurality of indoor bicycle specifications (all angles or seating angles between A1 and A2) comply with the restrictions of equation (3), wherein $N_{indoor}$ is the threshold. Although the angle A1 in FIG. 4 is smaller than the angle A2, the angle A1 may also be larger than the angle A2.

$$|F_{L,i} - F_{R,i}| \leq N_{indoor} \tag{3}$$

The processor 110 may obtain a plurality of detection results respectively corresponding to a plurality of outdoor bicycle specifications through the force sensor 150, and determine the angles A3 and A4 according to the plurality of detection results. The processor 110 may determine the bicycle specification f(A3) according to equation (4), and select the angle A3 corresponding to the bicycle specification f(A3) as the angle of the boundary L3 of the good zone 410, where j is the index of the plurality of outdoor bicycle specifications (j≤J, where J is the number of the plurality of outdoor bicycle specifications), $F'_{L,i}$ is the force exerted on the left half of the handlebar (or the left half of the saddle or the left pedal), and $F'_{R,i}$ is the force exerted on the right half of the handlebar (or the right half of the saddle or the right pedal). Similarly, the processor 110 may determine the bicycle specification f(A4) according to equation (5) and select the angle A4 corresponding to the bicycle specification f(A4) as the angle of the boundary L4 of the good zone 410. To illustrate, after obtaining the plurality of detection results respectively corresponding to the plurality of outdoor bicycle specifications, the processor 110 may select the bicycle specification f(A3) that is the most stable (i.e., the smallest absolute difference between the forces exerted by the user on the left half of the handlebar and the right half of the handlebar) to determine the angle A3, and may select the bicycle specification f(A4) that is the most unstable (i.e., the largest absolute difference between the forces exerted by the user on the left half of the handlebar and the right half of the handlebar) to determine the angle A4 according to the plurality of detection results.

$$f(A3) = \underset{j}{\operatorname{argmin}} |F'_{L,j} - F'_{R,j}| \tag{4}$$

$$f(A4) = \underset{j}{\operatorname{argmax}} |F'_{L,j} - F'_{R,j}| \tag{5}$$

It should be noted that the plurality of outdoor bicycle specifications (all angles or seating angles between A3 to A4) comply with the restrictions of equation (6), wherein $N_{outdoor}$ is the threshold, and $N_{outdoor} \geq N_{indoor}$. Although the angle A3 in FIG. 4 is smaller than the angle A4, the angle A3 may also be larger than the angle A4.

$$|F'_{L,j} - F'_{R,j}| \leq N_{outdoor} \tag{6}$$

The processor 110 may determine a scale factor r and an offset n according to equation (7), wherein $F_{L,A3}$ is the force exerted by the user on the left half of the handlebar (or the left half of the saddle or the left pedal) when the bicycle specification f(A3) is applied, $F_{R,A3}$ is the force exerted by the user on the right half of the handlebar (or the right half of the saddle or the right pedal) when the bicycle specification f(A3) is applied, $F_{L,A1}$ is the force exerted by the user on the left half of the handlebar (or the left half of the saddle or the left pedal) when the bicycle specification f(A1) is applied, and $F_{R,A1}$ is the force exerted by the user on the right half of the handlebar (or the right half of the saddle or the right pedal) when the bicycle specification f(A1) is applied. The processor 110 may adjust the scale factor r or the offset value n to satisfy equation (7), wherein r is a positive number and n is a real number.

$$|F_{L,A3} - F_{R,A3}| = r * |F_{L,A1} - F_{R,A1}| + n \tag{7}$$

To illustrate by way of example, for the good zone 410 corresponding to the bicycle specification f(A1), if the scale factor r is greater than 1, the processor 110 may increase the arc length of the good zone 410. For example, if the angle A1 is smaller than the angle A2, the processor 110 may decrease the angle A1 or increase the angle A2 so as to increase the arc length of the good zone 410. If the scale factor r is less than 1, the processor 110 may reduce the arc length of the good zone 410. For example, if the angle A1 is smaller than the angle A2, the processor 110 may increase the angle A1 or decrease the angle A2 so as to reduce the arc length of the good zone 410.

To illustrate by way of example, for the good zone 410 corresponding to the bicycle specification f(A1), if n≠0, the processor 110 may move the good zone 410 forward or backward. For example, processor 110 may increase the angles A1 and A2 so as to move good zone 410 forward. The processor 110 may reduce the angles A1 and A2 so as to move good zone 410 backward.

In an embodiment, the processor 110 may update the bicycle specification f(A1) according to the updated good zone 410 and output the updated bicycle specification f(A1). For example, if the good zone 410 changes, the processor 110 may adjust the saddle position, handlebar position, geometric size of the bicycle, or accessory matching manner of the bicycle specification f(A1) so as to update the bicycle specification f(A1).

Figure 5:
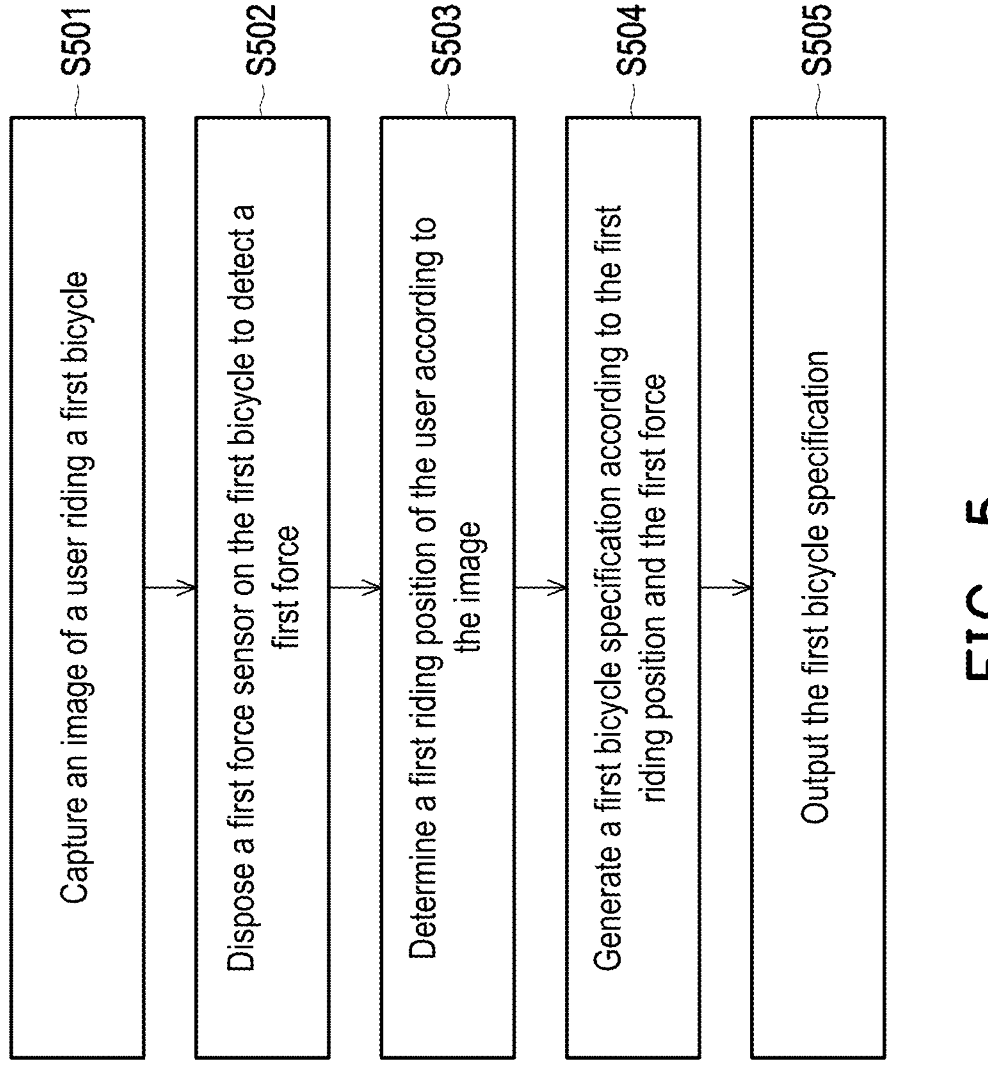
FIG. 5 is a flowchart of a method for bike fitting according to an embodiment of the disclosure.

FIG. 5 is a flowchart of a method for bike fitting according to an embodiment of the disclosure, in which the method may be implemented by the system 100 shown in FIG. 1. In step S501, an image of the user riding the first bicycle is captured. In step S502, a first force sensor is disposed on the first bicycle to detect the first force. In step S503, a first riding position of the user is determined according to the image. In step S504, a first bicycle specification is generated according to the first riding position and the first force. In step S505, the first bicycle specification is output.

In summary, in addition to using the image capture device to capture the image of the user riding the bicycle, the system of the disclosure further configures the force sensor on the bicycle to detect the force exerted by the user on the bicycle. When the user rides the bicycle indoors, the system may provide the user with the preliminary bicycle specification according to the image and the sensing results of the force sensor. The user may perform bike fitting and accordingly assemble the bicycle according to the bicycle specification provided by the system, and ride the bicycle in the outdoor environment. While the user is riding the bicycle in the outdoor environment, the system may record the force exerted by the user on the bicycle through the force sensor. The system may consider both data obtained when the user is riding the bicycle in the indoor environment and data obtained when the user is riding the bicycle in the outdoor environment to provide the user with the optimal bicycle specification. In this way, even if a perfect simulated riding environment may not be established indoors, the system of the disclosure may still provide users with bicycle specifications adapted for outdoor riding environments.

What is claimed is:

1. A system for bike fitting, comprising:

an image capture device, capturing an image of a user riding a first bicycle;

a first force sensor, disposed on the first bicycle to detect a first force;

a second force sensor; and a processor, communicatively connected to the image capture device, the first force sensor and the second force sensor, wherein the processor is configured to execute:

determining a first riding position of the user according to the image;

generating a first bicycle specification according to the first riding position and the first force; and outputting the first bicycle specification, wherein the second force sensor is disposed on a second bicycle corresponding to the first bicycle specification to detect a second force, wherein the processor updates the first bicycle specification according to the first riding position, the first force, and the second force.

2. A system for bike fitting, comprising:

an image capture device, capturing an image of a user riding a first bicycle;

a first force sensor, disposed on the first bicycle to detect a first force;

a second force sensor; and a processor, communicatively connected to the image capture device, the first force sensor and the second force sensor, wherein the processor is configured to execute:

determining a first riding position of the user according to the image;

generating a plurality of bicycle specifications comprises a first bicycle specification according to the first riding position and the first force; and outputting the first bicycle specification, wherein the second force sensor is disposed on a second bicycle corresponding to the first bicycle specification to detect a second force, wherein the processor selects the first bicycle specification from the plurality of bicycle specifications according to the second force, and outputs the selected first bicycle specification.

3. The system according to claim 2, further comprising:

a third force sensor, communicatively connected to the processor, and disposed on the second bicycle to detect a third force, wherein the processor selects the first bicycle specification from the plurality of bicycle specifications according to the second force and the third force.

4. The system according to claim 3, wherein the processor is configured to further execute:

calculating a first difference between the second force and the third force; and selecting the first bicycle specification from the plurality of bicycle specifications according to the first difference.

5. The system according to claim 4, further comprising:

a fourth force sensor, communicatively connected to the processor, and disposed on a third bicycle corresponding to a second bicycle specification to detect a fourth force; and a fifth force sensor, communicatively connected to the processor, and disposed on the third bicycle to detect a fifth force, wherein the processor calculates a second difference between the fourth force and the fifth force; and in response to the first difference being less than the second difference, the processor selects the first bicycle specification from the first bicycle specification and the second bicycle specification.

6. The system according to claim 2, wherein the second force comprises a first pressure distribution, and the system further comprises:

a third force sensor, communicatively connected to the processor, and disposed on a third bicycle corresponding to a second bicycle specification to detect a second pressure distribution, wherein the processor calculates a first pressure difference according to the first pressure distribution, and calculates a second pressure difference according to the second pressure distribution; and in response to the first pressure difference being less than the second pressure difference, the processor selects the first bicycle specification from the first bicycle specification and the second bicycle specification.

7. A system for bike fitting, comprising:

an image capture device, capturing an image of a user riding a first bicycle;

a first force sensor, disposed on the first bicycle to detect a first force;

a second force sensor, disposed on the first bicycle to detect a second force;

a third force sensor, disposed on a second bicycle corresponding to a second bicycle specification to detect a third force;

a fourth force sensor, disposed on the second bicycle to detect a fourth force; and a processor, communicatively connected to the image capture device, the first force sensor, the second force sensor, the third force sensor and the fourth force sensor, wherein the processor is configured to execute:

determining a first riding position of the user according to the image;

generating a first bicycle specification according to the first riding position and the first force;

outputting the first bicycle specification, wherein the processor is further configured to execute:

calculating a first difference between the first force and the second force, and calculating a second difference between the third force and the fourth force; and updating the first bicycle specification according to the first difference and the second difference.

8. The system according to claim 7, wherein the processor selects the second bicycle specification from a plurality of bicycle specifications according to the second difference so as to update the first bicycle specification.

9. The system according to claim 1, wherein the first force sensor comprises a strain gauge disposed on at least one of a saddle, a handlebar, a pedal, and a crankset of the first bicycle.

10. The system according to claim 1, wherein the first force sensor comprises an inertial measurement unit disposed on a crankset or a pedal of the first bicycle.

11. The system according to claim 1, wherein the first force sensor comprises a piezoelectric film, a resistive sensor, or a capacitive sensor disposed on at least one of a handlebar and a saddle of the first bicycle.

12. A method for bike fitting, comprising:

capturing an image of a user riding a first bicycle;

disposing a first force sensor on the first bicycle to detect a first force;

determining a first riding position of the user according to the image;

generating a first bicycle specification according to the first riding position and the first force;

outputting the first bicycle specification;

detecting a second force through a second force sensor disposed on a second bicycle corresponding to the first bicycle specification; and updating the first bicycle specification according to the first riding position, the first force, and the second force.

13. A non-volatile computer-readable storage medium applied for bike fitting, wherein the non-volatile computer-readable storage medium reads instructions via a processor to perform the following steps:

capturing an image of a user riding a first bicycle;

detecting a first force through a first force sensor disposed on the first bicycle;

determining a first riding position of the user according to the image;

generating a first bicycle specification according to the first riding position and the first force;

outputting the first bicycle specification;

detecting a second force through a second force sensor disposed on a second bicycle corresponding to the first bicycle specification; and updating the first bicycle specification according to the first riding position, the first force, and the second force.

14. The system according to claim 2, wherein the first force sensor comprises a strain gauge disposed on at least one of a saddle, a handlebar, a pedal, and a crankset of the first bicycle.

15. The system according to claim 2, wherein the first force sensor comprises an inertial measurement unit disposed on a crankset or a pedal of the first bicycle.

16. The system according to claim 2, wherein the first force sensor comprises a piezoelectric film, a resistive sensor, or a capacitive sensor disposed on at least one of a handlebar and a saddle of the first bicycle.

17. The system according to claim 7, wherein the first force sensor comprises a strain gauge disposed on at least one of a saddle, a handlebar, a pedal, and a crankset of the first bicycle.

18. The system according to claim 7, wherein the first force sensor comprises an inertial measurement unit disposed on a crankset or a pedal of the first bicycle.

19. The system according to claim 7, wherein the first force sensor comprises a piezoelectric film, a resistive sensor, or a capacitive sensor disposed on at least one of a handlebar and a saddle of the first bicycle.

* * * * *